July 22, 1958 F. J. LE ROY 2,844,251
PICKING AND CLEANING APPARATUS
Filed Aug. 10, 1953
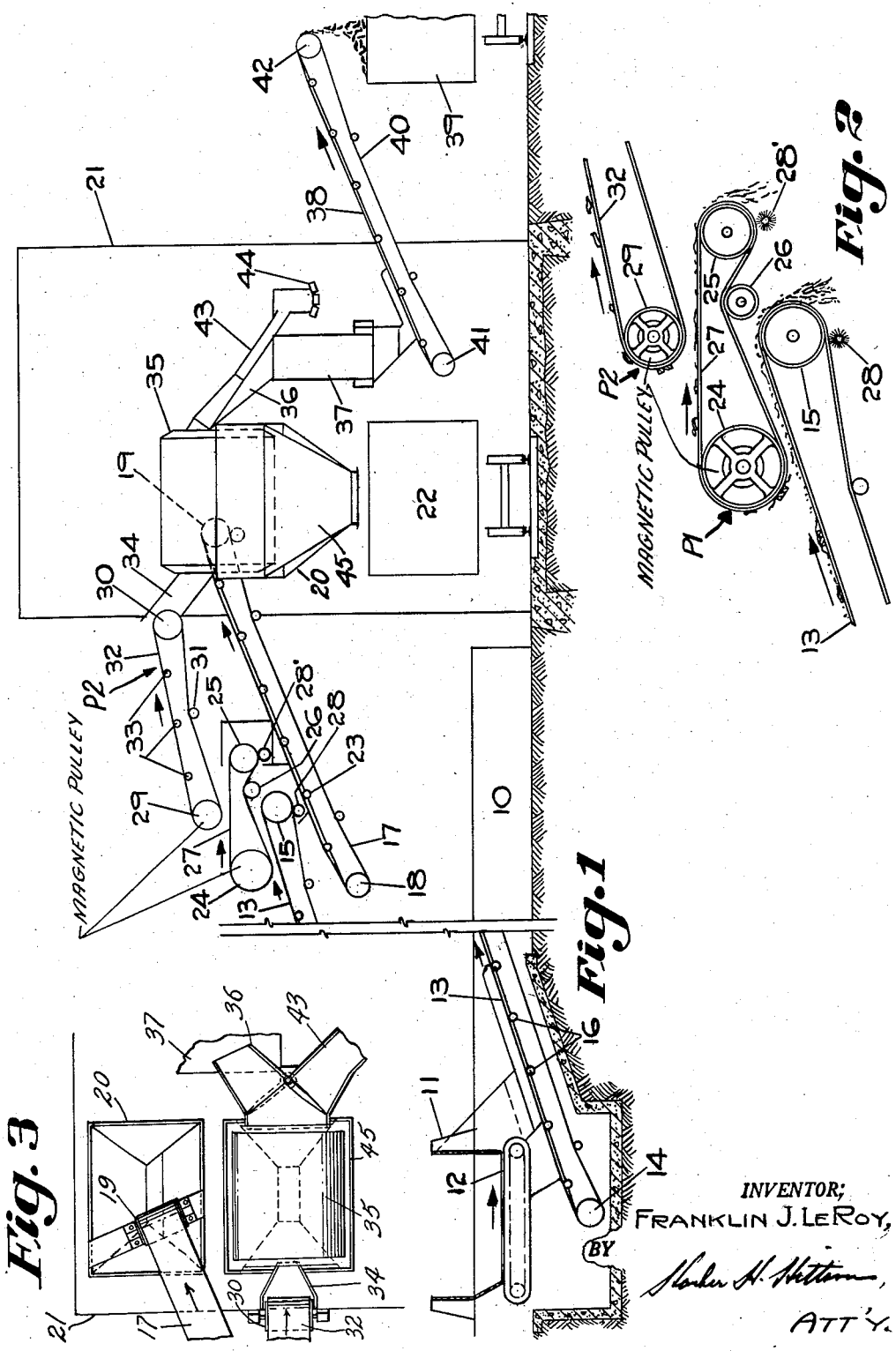
INVENTOR;
FRANKLIN J. LeROY,
BY
ATT'Y.

United States Patent Office 2,844,251
Patented July 22, 1958

2,844,251

PICKING AND CLEANING APPARATUS

Franklin J. Le Roy, Columbus, Ohio, assignor to The Jeffrey Manufacturing Company, a corporation of Ohio Application August 10, 1953, Serial No. 373,104

6 Claims. (Cl. 209—216)

This invention relates in general to apparatus for picking magnetic materials from non-magnetic materials, and more particularly to apparatus for sorting by picking pieces of magnetic material, such as bottle caps, tin cans, iron and the like, from rubbish, whereby the magnetic materials are separated from non-magnetic materials and are delivered substantially free of non-magnetic materials, such as ashes, papers, rags and the like.

One object of the invention is to provide an improved apparatus of the type set forth above.

Another object of the invention is to provide an improved apparatus of the type set forth that includes magnetic means for picking magnetic pieces of rubbish from a mixture of magnetic and non-magnetic rubbish and in which the magnetic pieces are rotated or inverted in order that they may be positioned above any non-magnetic pieces of rubbish, such as papers, rags and the like, that may have been between them and the pick-up means when they were picked up by the latter, and from which the magnetic pieces may be separated by a second pick-up means.

Other objects of the invention will appear hereinafter, the novel features and combinations being set forth in the appended claims.

In the accompanying drawings:

Fig. 1 is a diagrammatic view in side elevation of one apparatus including the invention;

Fig. 2 is a view of a portion of the apparatus shown in Fig. 1, the view illustrating pictorially the apparatus for separating magnetic pieces of rubbish from non-magnetic pieces of rubbish; and Fig. 3 is a top plan view showing the arrangement of the hopper and the rattler.

The apparatus shown in Fig. 1 of the drawings is specifically designed for separating pieces of material having magnetic properties, hereinafter referred to as magnetic material, such as bottle caps, tin cans, iron and the like, from material having non-magnetic properties, hereinafter referred to as non-magnetic material, such as ashes, papers, rags and the like, found in ordinary rubbish, such as is gathered by city refuse trucks and the like.

This apparatus includes a large dock 10 upon which rubbish may be dumped and in which there is a hopper 11 into which the rubbish may be dumped directly or scraped or shoved, as by a bulldozer or the like. An apron type feeder conveyer 12 forms the bottom of hopper 11 and feeds rubbish therefrom onto an upwardly inclined endless non-magnetic conveyor 13 in the form of an endless belt made of non-magnetic material, such as rubber, canvas or the like.

Conveyer 13 operates over a foot pulley 14 and a head pulley 15, and its upper or working run travels upwardly from the foot pulley 14 toward the head pulley 15, as indicated in the drawing by an arrow. Suitable idler rollers 16 are provided between said head and foot pulleys 15 and 14, respectively, for supporting the top working run of the conveyer 13 which is preferably formed into a trough by the idler rolls 16.

The head pulley 15 for conveyer 13 is positioned above an upwardly inclined discharge conveyer 17 in the form of an endless belt which is carried by a foot pulley 18 and a head pulley 19, which latter pulley is mounted in a hopper or bin 20 positioned within a building 21 to discharge into a railroad car 22. The upper or working run of discharge conveyer 17 between the pulleys 18 and 19 is supported and preferably troughed by a plurality of idler rolls 23, and it travels, as indicated by an arrow in the drawings, from the foot pulley 18 toward the head pulley 19, over which it discharges rubbish into the hopper 20.

A first magnetic materials sorting or picking device, indicated generally in the drawings by the mark P1, is positioned above head pulley 15 for the non-magnetic conveyer 13, and this device includes a magnetic pulley 24 of conventional construction which, for example, may be of the type shown in U. S. Patent No. 1,842,851 mounted above the conveyer 13 to rotate on an axis that extends transversely of the longitudinal axis of conveyer 13, an idler pulley 25 that is mounted above the discharge conveyer 17 to rotate about an axis parallel with the axis of rotation of magnetic pulley 24, a conveyer take-up idler pulley 26 mounted between pulleys 24 and 25, and an endless non-magnetic conveyer 27 in the form of an endless belt made of non-magnetic material, such as rubber, canvas or the like. The endless conveyer 27 is reeved over the pulleys 24, 25 and 26, as clearly indicated in the drawings, and its upper or working run travels from the magnetic pulley 24 toward the idler pulley 25.

Suitable brushes 28 and 28' of conventional construction are provided for brushing from the conveyers 13 and 27, respectively, any rubbish that may adhere thereto after the conveyers travel around the idler or head pulleys 15 and 25, respectively. Rubbish that is spilled and brushed from the conveyer 13 falls onto the discharge conveyer 17, and rubbish which is discharged and brushed from the conveyer 27 is directed by a chute onto the discharge conveyer 17.

The apparatus also includes a second magnetic materials sorting or picking device, indicated generally in the drawings by the mark P2, which includes a magnetic pulley 29 of conventional construction and similar to pulley 24 positioned above the working run of the conveyer 27 and mounted to rotated on an axis parallel with the axis of magnetic pulley 24, an idler or head pulley 30, a take-up pulley 31, and an upwardly inclined conveyer 32 in the form of an endless belt made of non-magnetic material, such as rubber, canvas or the like, which is reeved over the pulleys 29, 30 and 31, as clearly indicated in the drawings. A plurality of idler rolls 33 support the upper or working run of the conveyer 32 between the pulleys 29 and 30.

The upper or working run of conveyer 32 travels from the magnetic pulley 29 to the head pulley 30 which is positioned above the magnetic pulley 29 and in the entrance to a chute 34 which leads to a rattler and washer 35 in the form of a perforated power driven rotary cylinder or drum of conventional construction. The cylinder or drum may exhaust through a chute 36 into a crusher 37 which in turn discharges onto a magnetic material discharge conveyer 38 that spills material into a second railroad car 39. Conveyer 38 may be of any conventional construction and, as shown, it includes a conveyer in the form of an endless belt 40 that travels over foot pulley 41, a head pulley 42 positioned above railroad car 39, and a plurality of idler rolls that support its upper or working run.

The cylinder or drum of rattler and washer 35 may also discharge materials through a chute 43 to a conveyer apparatus indicated at 44. A valve mechanism, not shown, of conventional construction is provided for causing the rattler and washer to discharge selectively into the chute 36 or 43.

In operating the apparatus, the rubbish from which magnetic materials are to be removed is usually sent through an incinerator before being placed on the dock 10 or in the hopper 11 to be fed through the apparatus in order that as much as possible of the combustible materials therein may be reduced to ashes. However, usually not all of the combustible materials are consumed in such an incinerating operation, and the rubbish placed on the dock 10 or in the hopper 11 will almost invariably include some combustible materials, such as papers, rags and the like. The main function of the apparatus is to separate the magnetic pieces of rubbish from the incinerated rubbish and to deliver the magnetic pieces of rubbish as free as possible from non-magnetic materials, such as ashes, rags, papers and the like.

All of the conveyers, the magnetic sorter or picker mechanisms P1 and P2, the rattler and washer 35, and the crusher 37, are power driven by suitable mechanisms, not shown, and all are in operation when the apron feeder 12 is operated to feed rubbish from the hopper 11 onto the non-magnetic conveyer 13. Non-magnetic conveyer 13, of course, conveys the rubbish received from feeder conveyer 12 upwardly toward the magnetic pulley 24 where the rubbish is caused to pass below magnetic pulley 24 and through the field of the magnetic flux thereof. The position of magnetic pulley 24 may, of course, be adjusted upwardly and downwardly with respect to the conveyer 13.

It will be seen that the rubbish being conveyed by non-magnetic conveyer 13 will have imbedded in it pieces of magnetic material, some of which may be covered by pieces of non-magnetic material, such as paper, rags and the like, and that the magnetic pulley 24 in itself is incapable of sorting those magnetic pieces of material which are so covered, from the sheet-like non-magnetic materials lying upon and covering them. That is, magnetic pulley 24 will pick up all magnetic pieces of material from the rubbish on conveyer 13, and the non-magnetic materials, such as papers, rags and the like, which are between the pieces of magnetic material and the pulley 24, may be sandwiched between the pieces of magnetic material and the non-magnetic conveyer 27 that operates over the magnetic pulley 24, as clearly illustrated in Fig. 2 of the drawings.

The pieces of non-magnetic rubbish that pass below magnetic pulley 24 are, of course, discharged or spilled from the conveyer 13 over the head pulley 15 onto the discharge conveyer 17 which in turn discharges them into the hopper or bin 20. Any non-magnetic material that adheres to the conveyer 13 is brushed therefrom by the brush 28 which may, if desired, be a power driven rotary brush.

It will be seen that pieces of magnetic material that have been picked up by magnetic pulley 24 will be held against the non-magnetic conveyer 27 and that as the magnetic pulley 24 rotates, in a clockwise direction as seen in the drawings, the pieces of magnetic material will be rotated or inverted and then conveyed by non-magnetic conveyer 27 away from the magnetic pulley 24 and out of the magnetic flux thereof. It will also be seen that when the pieces of magnetic material are thus rotated or inverted, that they will be positioned so as to rest upon any pieces of non-magnetic material which were sandwiched between them and the non-magnetic conveyer 27 when they were picked up by the magnetic pulley 24.

Non-magnetic conveyer 27 conveys these pieces of magnetic material and the non-magnetic materials toward the magnetic pulley 29. Magnetic pulley 29 functions in a manner similar to that of magnetic pulley 24, previously described, and it picks the pieces of magnetic material from the top of any pieces of non-magnetic materials on the conveyer 27. Non-magnetic conveyer 32 associated with magnetic pulley 29 conveys the magnetic materials to the chute 34 which feeds them into the rattler and washer 35, while non-magnetic materials remaining on conveyer 27 are discharged thereby into the chute which directs them onto the discharge conveyer 17.

The rattler or washer 35 may be employed selectively as a rattler or as a rattler and washer, and when the rubbish being treated has first been incinerated it is usual to employ the apparatus 35 as a rattler only, to shake or rattle from the magnetic materials rust and small pieces of non-magnetic materials that may be adhering to the magnetic pieces. The rattler 35 which may be of the type shown in U. S. Patent No. 2,027,375, for example, includes a screen-like or perforated rotating cylinder or drum, and the materials which pass through this screen or drum are received in a hopper or tank 45 that may be cleaned of materials from time to time, as necessary. If desired, the materials removed from hoppers 20 and 45 may be fed into railroad car 22. Magnetic materials discharged or exhausted from rattler 35 are fed through the chute 36 and are crushed or otherwise reduced in size by the crusher 37 from which they are fed by conveyor 38 into the second railroad car 39.

When the apparatus is employed to treat unincinerated rubbish, the magnetic materials are usually washed by sprays of water or the like while they are being rattled in the washer and rattler 35, and the magnetic materials discharged or exhausted therefrom may be directed selectively through the crusher 37 into the railroad car 39 or they may be directed through chute 43 to conveyer 44. Usually the magnetic materials are directed to conveyer 44 when it is desired, for example, to send tinned cans to a de-tinning apparatus, not shown, to which conveyer 44 may lead.

While it is preferred that the conveyers 13, 27 and 32 be of an endless non-magnetic belt type, as described, other types of non-magnetic conveyers may be substituted in the apparatus for carrying out the invention defined in the claims.

From the foregoing it will be seen that by this invention there is provided an improved sorting or picking apparatus for removing materials having magnetic properties from materials having non-magnetic properties, and that the apparatus is particularly efficient in operation because its first magnetic sorting or picking apparatus P1 rotates or inverts the magnetic materials to place them above or on top of any non-magnetic materials that may have been sandwiched between them and the magnetic pick-up means, and that therefore the second magnetic pick-up means P2 may readily pick or skim the magentic materials from the top of the non-magnetic materials, thereby making a relatively clean separation of magnetic materials from non-magnetic materials, and which magnetic materials are further treated, as by rattling, rattling and washing, and selectively by crushing or not crushing, as desired.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Apparatus for picking magnetic materials from rubbish including a first conveyer adapted to carry said rubbish, a discharge conveyer for conveying non-magnetic rubbish discharged from said first conveyer, magnetic picker means positioned above said first conveyer to pick magnetic materials from the rubbish on said first conveyer, said magnetic picker including a magnetic pulley for picking up and rotating magnetic materials and a non-magnetic conveyer for conveying said rotated materials from said magnetic pulley, a second magnetic picker means positioned above said non-magnetic conveyer for picking magnetic materias from the latter including a magnetic pulley for picking up and rotating magnetic materials and a non-magnetic conveyer for conveying materials from said magnetic pulley, and a rattling device receiving said magnetic materials for cleaning the latter of rust, fine rubbish and the like, said first picker conveyer discharging non-magnetic materials to said discharge conveyer.

2. Apparatus for picking magnetic materials from rubbish including a first conveyer adapted to carry said rubbish, magnetic picker means positioned above said first conveyer to pick magnetic materials from the rubbish on said first conveyer, said magnetic picker including a magnetic pulley for picking up and rotating magnetic materials and a non-magnetic conveyer for conveying said rotated materials from said magnetic pulley, a second magnetic picker means positioned above said non-magnetic conveyer for picking magnetic materials from the latter including a magnetic pulley for picking up and rotating magnetic materials and a non-magnetic conveyer for conveying materials from said magnetic pulley, and a rattling device receiving said magnetic materials for cleaning the latter of rust, fine rubbish and the like.

3. Apparatus for picking magnetic materials from rubbish including a first conveyer adapted to carry said rubbish, magnetic picker means positioned above said first conveyer to pick magnetic materials from the rubbish on said first conveyer, said magnetic picker including a magnetic pulley for picking up and rotating magnetic materials and a non-magnetic conveyer for conveying said rotated materials from said magnetic pulley, and a second magnetic picker means positioned above said non-magnetic conveyer for picking magnetic materials from the latter including a magnetic pulley for picking up and rotating magnetic materials and a non-magnetic conveyer for conveying materials from said magnetic pulley.

4. Apparatus for picking magnetic materials from raw rubbish including a first conveyer adapted to carry raw rubbish, magnetic picker means positioned above said first conveyer to pick magnetic materials from the raw rubbish on said first conveyer, said magnetic picker including a magnetic pulley for picking up and rotating magnetic materials and a non-magnetic conveyer for conveying said rotated materials from said magnetic pulley, and a second magnetic picker means positioned above said non-magnetic conveyer for picking magnetic materials from the latter.

5. Magnetic separating apparatus for picking pieces of magnetic material from a mixture of magnetic and non-magnetic materials, said apparatus including means for carrying said mixture of materials, picker means including magnet means for picking magnetic pieces from said mixture and rotating them, said picker means including means for carrying materials from said magnet means, and a second picker means including magnet means for picking magnetic pieces of material from the first said picker means.

6. Magnetic separating apparatus for picking pieces of magnetic material from a mixture of magnetic and non-magnetic materials, said apparatus including means for carrying said mixture of materials, picker means including magnet means for picking magnetic pieces from said mixture, said picker means including means for carrying materials from said magnet means, and a second picker means including magnet means for picking magnetic pieces of material from the first said picker means.

References Cited in the file of this patent
UNITED STATES PATENTS

| | | |
|---|---|---|
| 1,144,383 | Rothert | June 27, 1915 |
| 1,842,851 | Ullrich | Jan. 26, 1932 |
| 2,027,375 | Fraser | Jan. 14, 1936 |